United States Patent
Hou

(10) Patent No.: US 9,195,280 B2
(45) Date of Patent: Nov. 24, 2015

(54) CASE FASTENING DEVICE

(71) Applicant: NZXT Corporation, El Monte, CA (US)

(72) Inventor: Johnny Hou, El Monte, CA (US)

(73) Assignee: NZXT Corporation, El Monte, CA (US)

(*) Notice: Subject to any disclaimer, the term of this patent is extended or adjusted under 35 U.S.C. 154(b) by 513 days.

(21) Appl. No.: 13/655,178

(22) Filed: Oct. 18, 2012

(65) Prior Publication Data

US 2014/0112712 A1   Apr. 24, 2014

(51) Int. Cl.
*G06F 1/00* (2006.01)
*G06F 1/18* (2006.01)

(52) U.S. Cl.
CPC .............. *G06F 1/187* (2013.01); *Y10T 403/581* (2015.01)

(58) Field of Classification Search
None
See application file for complete search history.

(56) References Cited

U.S. PATENT DOCUMENTS

| | | | | |
|---|---|---|---|---|
| 8,259,441 B2* | 9/2012 | Chuang | .................... | 361/679.31 |
| 8,837,136 B2* | 9/2014 | Hu et al. | .................. | 361/679.33 |
| 8,917,518 B2* | 12/2014 | Hu et al. | ....................... | 361/755 |
| 2005/0007732 A1* | 1/2005 | Hsu | ............................. | 361/685 |
| 2005/0237709 A1* | 10/2005 | Huang | .......................... | 361/685 |
| 2006/0033409 A1* | 2/2006 | Chen et al. | ..................... | 312/333 |
| 2006/0232938 A1* | 10/2006 | Yeh | ............................... | 361/704 |
| 2008/0061663 A1* | 3/2008 | Wu | ................................ | 312/333 |
| 2013/0099640 A1* | 4/2013 | Hu et al. | ................... | 312/223.2 |
| 2014/0112712 A1* | 4/2014 | Hou | ............................. | 403/316 |

* cited by examiner

*Primary Examiner* — Victor MacArthur
(74) *Attorney, Agent, or Firm* — Muncy, Geissler, Olds & Lowe, P.C.

(57) ABSTRACT

The present invention discloses a case fastening device, which is applied to a case. The handle and the plate member are respectively pivotally coupled to two ends of the base by a first pivotal element and a second pivotal element, and rotatable above the base. Two ends of the metallic buckle are respectively snap-fitted to the handle and the plate member. The bayonet bolts are fixed on the plate member. While the user presses down the handle, the metallic buckle actuates the plate member to rotate above the base, and let the-bolts be inserted into the second through-hole of the base and the first through-hole of the case, whereby the bayonet bolts are mounted to the case. While the user lifts up the handle, the bolts are withdrawn from the first through-hole and the second through-hole, whereby the bolts are dismounted from the case.

8 Claims, 5 Drawing Sheets

CASE FASTENING DEVICE

BACKGROUND OF THE INVENTION

1. Field of the Invention

The present invention relates to a case fastening device, particularly to a case fastening device able to mount a peripheral to a case toollessly and screwlessly.

2. Description of the Related Art

Computers are indispensable for living and working nowadays, whereby people can edit, store and transmit information conveniently and efficiently. Computers are generally referred to machines undertaking logic operations and may be categorized into servers and personal computers. A personal computer normally comprises a case, a motherboard, CPU, memory modules, a sound card, a display card, a power supply, and peripherals, such as hard disk drives, optical disk drives, disk burners, etc.

Currently, peripherals, especially hard disk drives, optical disk drives and disk burners, are secured to frames with hand tools and screws. There are numerous types of screws. Therefore, the user has to spend time in preparing various types of screw drivers in mounting, dismounting, maintaining, or replacing peripherals. Besides, screws are very likely to lose. If the user does not find that a screw is left in the motherboard, the motherboard will short-circuit when the computer is turned on. Therefore, the conventional technology for mounting peripherals still has room to improve.

In view of the problems and shortcomings of the prior art, the present invention provides a case fastening device, so as to overcome the problems of the prior art.

SUMMARY OF THE INVENTION

A major objective of the present invention is to provide a case fastening device, wherein a simple switching operation can actuate three components to rotate and vary the distance therebetween, whereby a case can be mounted and dismounted easily.

To achieve the abovementioned objective, the present invention proposes a case fastening device, which is applied to a case, that the case has at least a first through-hole. The case fastening device of the present invention comprises a base, a handle, a plate member, a metallic buckle and at least a bolt. The base has at least a second through-hole corresponding to the first through-hole. The handle is pivotally coupled to the base by a first pivotal element and able to rotate. The handle has two snap-fit holes. The plate member is pivotally coupled to the base by a second pivotal element and able to rotate. The plate member has a snap-fit element and at least a third through-hole corresponding to the first through-hole and second through-hole. Two ends of the metallic buckle are respectively snap-fitted to the snap-fit holes and snap-fit element, whereby the handle and the plate member are actuated to rotate simultaneously above the base by the metallic buckle, the first pivotal element and the second pivotal element. The bolts are inserted into the third through-holes and fixed to the plate member. While the handle is pressed down, the handle actuates the metallic buckle to drive the plate member to rotate above the base, whereby the bolts are inserted through the second through-holes into the first through-holes and fixed to the case. While the handle is lifted up, the handle actuates the metallic buckle to drive the plate member to rotate above the base, whereby the bolts are withdrawn from the first through-holes and the second through-holes and dismounted from the case. The present invention can use a simple switching operation (pressing down or lifting up the handle) to mount the bolts to the case or dismount the bolts from the case, wherein the rotation mechanism of the metallic buckle, the first pivotal element and the second pivotal element enables the handle to actuate the plate member to rotate above the base and let the bolts be inserted into or withdrawn from the case.

Below, embodiments are described in detail to make easily understood the objectives, technical contents, characteristics and accomplishments of the present invention.

DETAILED DESCRIPTION OF THE INVENTION

Figure 1:
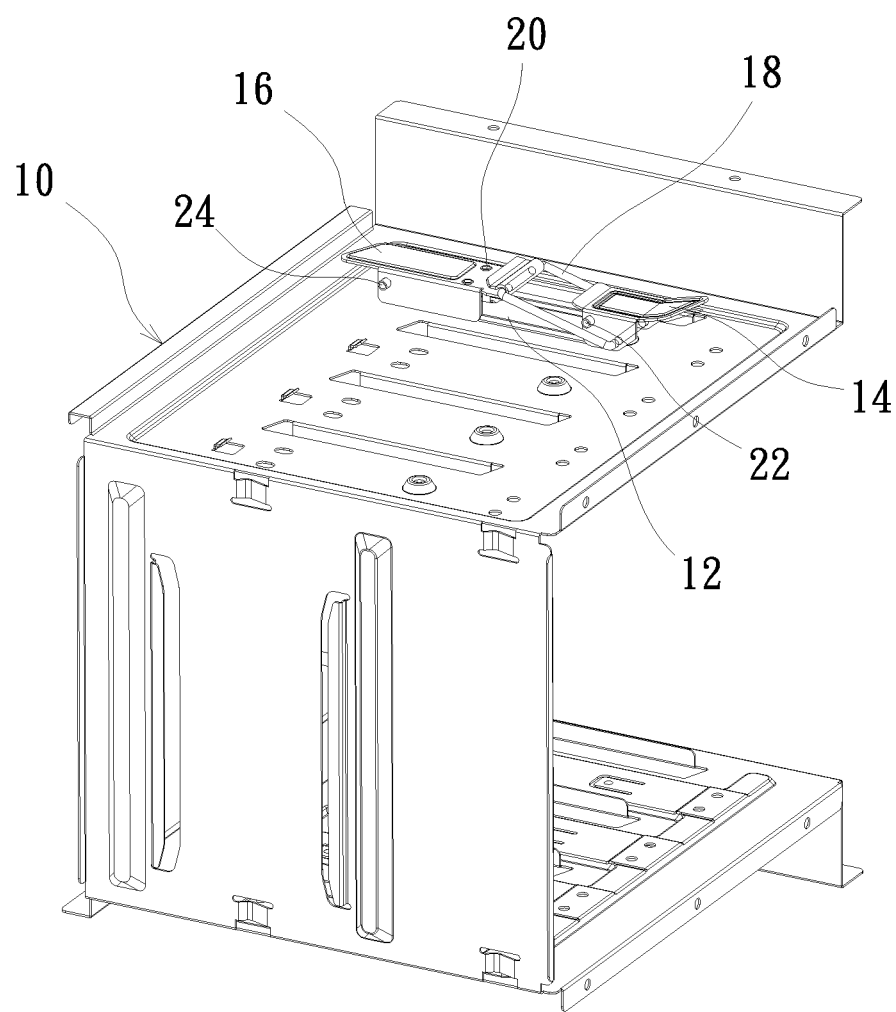
FIG. 1 is a perspective view of a case fastening device according to one embodiment of the present invention.
Figure 2:
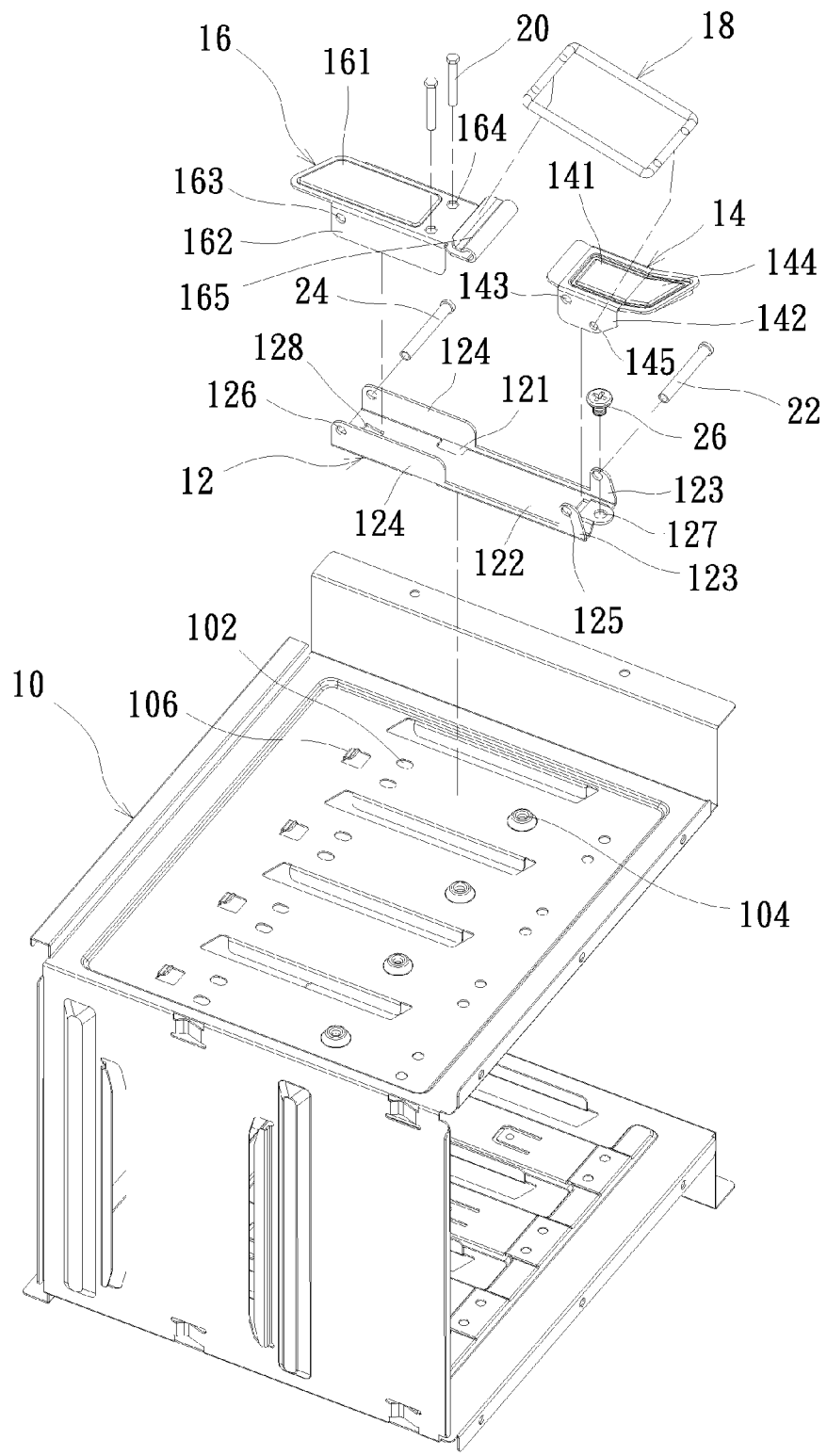
FIG. 2 is an exploded view of a case fastening device according to one embodiment of the present invention.

In order to mount, dismount, maintain and replace peripherals of computers conveniently, the present invention proposes a novel case fastening device, which is mainly applied to a case. Refer to FIG. 1 and FIG. 2 respectively a perspective view and an exploded view of a case fastening device according to one embodiment of the present invention. In one embodiment, a case 10 is mounted or dismounted simply via bolts. Therefore, the case 10 has at least a first through-hole 102, which will be further described in detail below.

The case fastening device of the present invention comprises a base 12, a handle 14, a plate member 16, a metallic buckle 18 and at least a bolt 20. The handle 14 and the plate member 16 are respectively pivotally coupled to two ends of the base 12 by a first pivotal element 22 and a second pivotal element 24, and able to rotate above the base 12. Two ends of the metallic buckle 18 are respectively snap-fitted to the handle 14 and the plate member 16. The bolts 20 are inserted through and fixed to the plate member 16. The rotation mechanism of the metallic buckle 18, the first pivotal element 22 and the second pivotal element 24 enables the handle 14 and the plate member 16 to rotate simultaneously above the base 12, whereby the bolts 20 are inserted into or withdrawn from the case 10. The details thereof will be described below.

Below are described in detail the components and the connection thereof to further demonstrate the unique structural design of the present invention. The base 12 has at least a second through-hole 121 corresponding to the first through-hole 102. Two ends of the bottom 122 of the base 12 are extended upright to form two first lateral sides 123 and two second lateral sides 124. Each first lateral side 123 has a first pivotal hole 125. Each second lateral side 124 has a second pivotal hole 126. The second through-holes 121 are located on the bottom 122. Two edges of the bottom 141 of the handle 14 are extended downward to form two third lateral sides 142. Each third lateral side 142 has a third pivotal hole 143 corresponding to the first pivotal hole 125. The first pivotal element 22 is inserted through the first pivotal holes 125 and the third pivotal holes 143 to pivotally couple the handle 14 to the base 12. The tail of the bottom 141 of the handle 14 is slightly bent upward to form an operation element 144. The plate member 16 is arranged opposite to the handle 14. Two edges of the bottom 161 of the plate member 16 are extended downward to form two fourth lateral sides 162. Each fourth lateral side 162 has a fourth pivotal hole 163. The second pivotal element 24 is inserted through the second pivotal holes 126 and the fourth pivotal holes 163 to pivotally couple the plate member 16 to the base 12. The bottom 161 of the plate member 16 has at least a third through-hole 164 corresponding to the first through-hole 102 of the case 10 and the second through-hole 121 of the base 12. The bolts 20 are inserted through the third through-holes 164 and fixed to the plate member 16.

The handle 14 further has two snap-fit holes 145 respectively formed in two third lateral sides 142. The third pivotal hole 143 is separated from two snap-fit holes 145 by a given distance, whereby to favor the rotation in operation. The plate member 16 has a snap-fit element 165, which is a bent metallic plate. Two ends of the metallic buckle 18 are respectively snap-fitted to two snap-fit holes 145 and the bent metallic plate. Thereby, the handle 14 and the plate member 16 are mechanically linked by the metallic buckle 18, and the two snap-fit holes 145 and the bent metallic plate have allowances enabling the metallic buckle 18 to rotate.

Below is described the process of assembling the case fastening device fixed to the case 10. The case 10 further comprises at least a installation member. Two ends of the installation member respectively have a first locking hole 104 and a fastening element 106. In one embodiment, the fastening element 106 is a metallic plate bent into a hook. The first locking hole 104 is corresponding to a second locking hole 127 of the base 12. A locking element 26 (such as a screw) is driven through the second locking hole 127 and the first locking hole 104. Then, the fastening element 106 is fastened to a fastening hole 128 of the base 12. Thus, the base 12 is secured to the case 10.

Figure 3A:
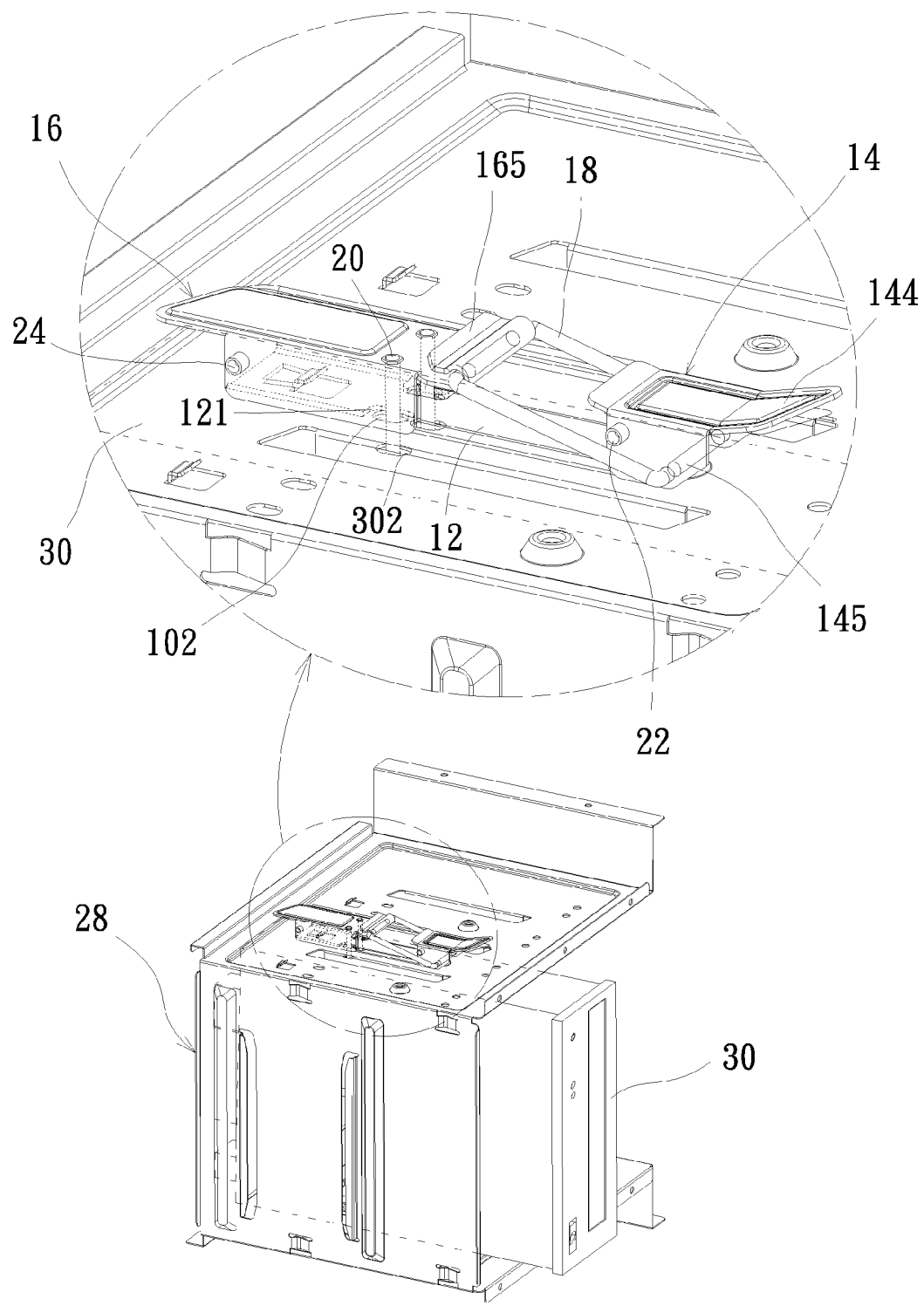
FIG. 3A schematically shows that bolts are mounted to a case according to one embodiment of the present invention.
Figure 3B:
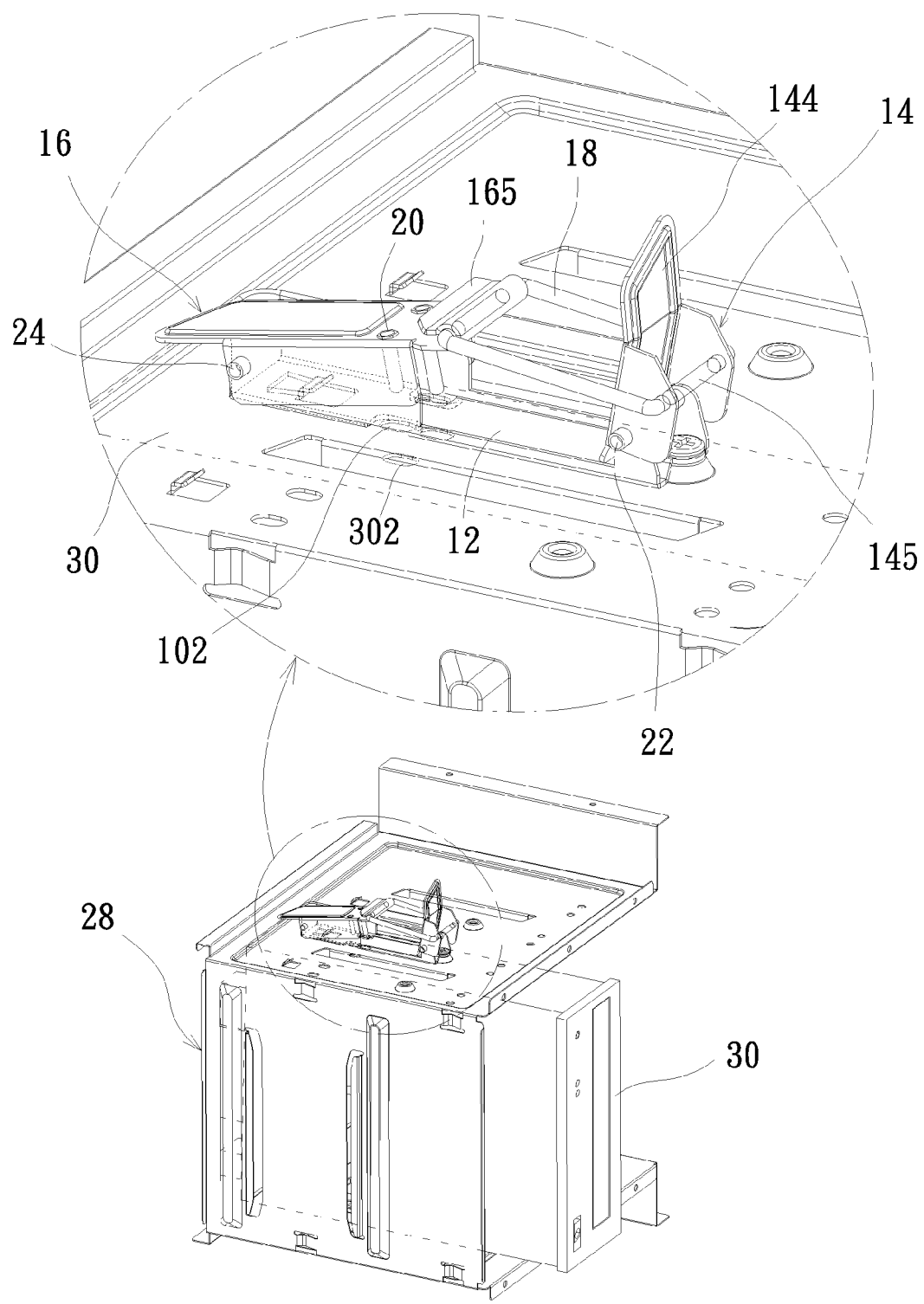
FIG. 3B schematically shows that bolts are dismounted from a case according to one embodiment of the present invention.

Refer to FIG. 3A and FIG. 3B respectively a diagram schematically showing bolts are mounted to a case and a diagram schematically showing that bolts are dismounted from a case. As shown in FIG. 3A, the case is an optical disk drive (ODD) case 28 able to accommodate at least a optical disk drive 30. The optical disk drive 30 has at least a bolt hole 302 corresponding to the first through-hole 102. When the user presses down the operation element 144 of the handle 14, the metallic buckle 18 (such as a square buckle) to actuate the handle 14 and the plate member 16 to rotate above the base 12, wherein the handle 14 and the plate member 16 rotate above the base 12 via the rotation mechanism of the first pivotal element 22 and the second pivotal element 24. Between the handle 14 and the plate member 16 has a distance configuration, and metallic buckle 18 by handle 14 is pressed down, the snap-fit holes 145 of the handle 14 and the snap-fit element 165 of the plate member 16 move relatively, exerting a stretching force on the metallic buckle 18. Thus, the handle 14 and the plate member 16 are pulled down to lie in a horizontal plane securely. Then, the bolts 20 are inserted through the second through-holes 121 of the base 12 and the first through-hole 102 of the ODD case 28 into the bolt holes 302 of the optical disk drive 30. Thus, the optical disk drive 30 is mounted to the ODD case 28 securely.

Refer to FIG. 3B. While intending to dismount the optical disk drive 30, the user lifts up the handle 14. The metallic buckle 18 (such as a square buckle) enables the handle 14 and the plate member 16 to rotate above the base 12, at this moment, the snap-fit holes 145 of the handle 14 and the snap-fit element 165 of the plate member 16 move relatively to release the handle 14 and the plate member 16 from the secured state. In other words, the handle 14 and the plate member 16 rotate above the base 12 via the rotation mechanism of the first pivotal element 22 and the second pivotal element 24. Thus, the bolts 20 are actuated by the dismounting operation of the handle 14 to withdraw from the bolt holes 302 of the optical disk drive 30. Then, the optical disk drive 30 is dismounted from the ODD case 28.

Figure 4:
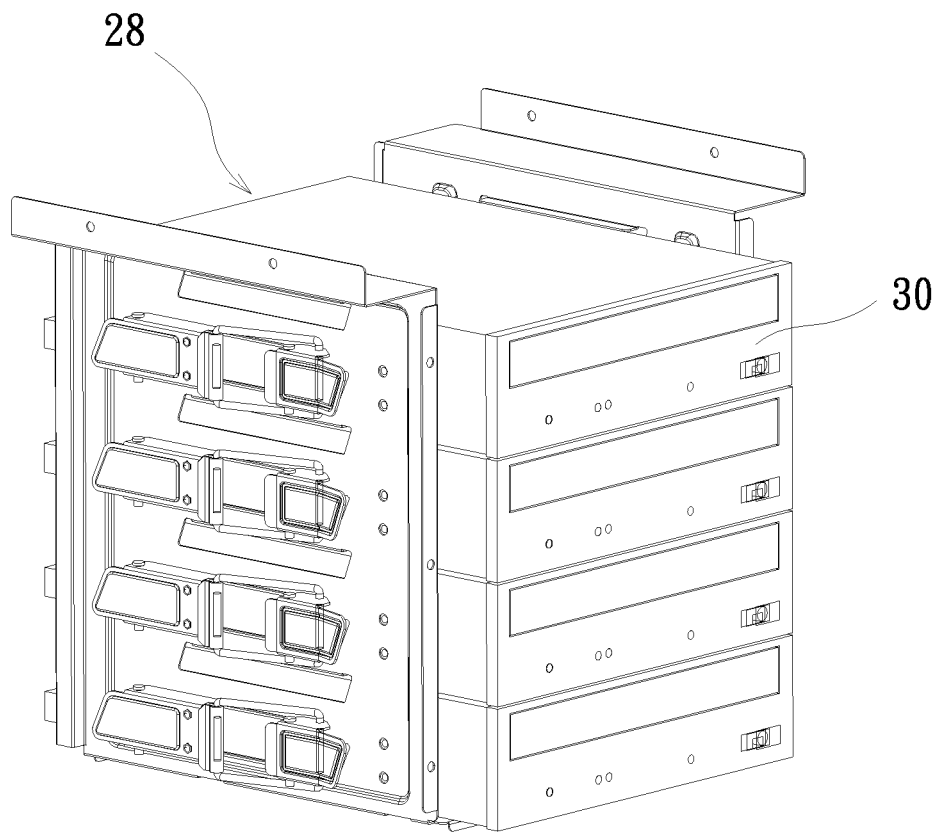
FIG. 4 schematically shows that a case fastening device is applied to securing an optical disk drive to an optical disk drive case according to one embodiment of the present invention.

Refer to FIG. 4. In one embodiment, the ODD case 28 may accommodate several optical disk drives 30, wherein the ODD case 28 has several installation members corresponding to the optical disk drives 30, and wherein a plurality of case fastening devices is assembled to the installation members the fixing devices. According to the processes described above, the user can mount several optical disk drives 30 to the ODD case 28 or dismount the optical disk drives 30 from the ODD case 28. Thus, the present invention enables user to mount/dismount a case in replacement or maintenance in a simple way without using any hand tool or fastener. Therefore, the present invention can promote operation convenience of users.

In one embodiment, the case is a storage box having a container and a cover connected with the container, such as a cosmetic box, a tool box, or a cabinet. The case fastening device of the present invention may be used to fix the cover to the container. The cover has at least a bolt hole corresponding to the first through-hole. The bolts are inserted through the second through-holes, the first through-holes into the bolt holes, fixing the cover to the container. The case fastening device of the present invention functions like a common snap-fit mechanism of a storage box. However, the case fastening device of the present invention is easier to operate and more reliable than the conventional snap-fit mechanism. Therefore, the present invention has high potential in the market.

In conclusion, the present invention enables the user to mount/dismount a case via simply pressing down/lifting up the handle. The present invention realizes the function of mounting and dismounting a case, using the rotation mechanism and spatial disposition of only three components, i.e. the metallic buckle, first pivotal element, and second pivotal element. Therefore, the present invention has advantages of simple structure and easy operation and provides more convenience for people.

The embodiments described above are only to exemplify the present invention but not to limit the scope of the present invention. Any equivalent modification or variation according to the characteristic or spirit of the present invention is to be also included within the scope of the present invention.

What is claimed is:

1. A case fastening device, which is applied to a case having at least a first through-hole, comprising
   a base having at least a second through-hole corresponding to said first through-hole of said case;
   a handle pivotally coupled to said base, so that said handle rotates above said base, and having two snap-fit holes;
   a plate member pivotally coupled to said base, so that said plate member rotate above said base, and having a snap-fit element and at least a third through-hole corresponding to said first through-hole and said second through-hole;
   a metallic buckle having two ends respectively snap-fitted to said snap-fit holes and said snap-fit element, and cooperating with a first pivotal element and a second pivotal element to actuate said handle and said plate member to rotate simultaneously above said base; and
   at least a bolt inserted into said third through-hole and fixed to said plate member, wherein said handle is pressed down to drive said metallic buckle to actuate said plate member to rotate above said base and control said bolt to pass through said second through-hole and enter said first through-hole whereby said bolt is mounted to said case, or wherein said handle is lifted up to drive said metallic buckle to actuate said plate member to rotate above said base and control said bolt to withdraw from said first through-hole and said second through-hole whereby said bolt is dismounted from said case.

2. The case fastening device according to claim 1, wherein two ends of a bottom of said base are extended upright to form two first lateral sides and two second lateral sides, and wherein said two first lateral sides respectively have first pivotal holes, and wherein said two second lateral sides respectively second pivotal holes, and wherein two edges of a bottom of said handle are extended downward to form two third lateral sides, and wherein said two third lateral sides respectively have third pivotal holes corresponding to said first pivotal holes, and wherein said first pivotal element is inserted through said first pivotal holes and said third pivotal holes to pivotally couple said handle to said base, and wherein two edges of a bottom of said plate member are extended downward to form two fourth lateral sides, and wherein said two fourth lateral sides respectively have fourth pivotal holes, and wherein said second pivotal element is inserted through said second pivotal holes and said fourth pivotal holes to pivotally couple said plate member to said base.

3. The case fastening device according to claim 2, wherein said snap-fit holes respectively located on said two third lateral sides, and wherein a given distance exists between said third pivotal hole and said snap-fit hole.

4. The fastening device according to claim 1, wherein said handle has an operation element, which is pressed down or lifted up to control said switch member to rotate above said base.

5. The case fastening device according to claim 1, wherein said case includes at least a installation member, and wherein two ends of said installation member respectively have a first locking hole and a fastening element, and wherein said first locking hole is corresponding to a second locking hole of said base, and wherein a locking element is driven through said first locking hole and said second locking hole, and said fastening element is fastened to a fastening hole of said base, to secure said base to said case.

6. The case fastening device according to claim 1, wherein said case is an optical disk drive case able accommodate at least a optical disk drive, and wherein said optical disk drive has at least a bolt hole corresponding to said first through-hole, and wherein said bolt is inserted through said second through-hole and said first through-hole into said bolt hole to secure said optical disk drive to said case.

7. The case fastening device according to claim 1, wherein said case is a storage box having a container and a cover connected with said container, and wherein said cover has at least a bolt hole corresponding to said first through-hole, and wherein said bolt is inserted through said second through-hole and said first through-hole into said bolt hole to secure said cover to said container.

8. The case fastening device according to claim 1, wherein said snap-fit element is a bent metallic plate, and wherein two ends of said metallic buckle are respectively snap-fitted to said snap-fit holes and said bent metallic plate, and wherein said snap-fit holes and said bent metallic plate have allowances for movement of said metallic buckle.

* * * * *